United States Patent

Padgett et al.

[15] 3,701,103

[45] Oct. 24, 1972

[54] REMOTE CONTROL RECEIVER USING A PHASE LOCKED LOOP

[72] Inventors: William J. Padgett, Berwyn; Donald A. Wison, Chicago, both of Ill.

[73] Assignee: Warwick Electronics Inc.

[22] Filed: April 7, 1971

[21] Appl. No.: 132,129

[52] U.S. Cl. ..................340/170, 325/346, 325/349, 325/419, 325/420, 325/423, 329/123, 329/136, 340/148, 340/171, 340/172

[51] Int. Cl. ..............................................H04q 9/02

[58] Field of Search.........325/346, 349, 417, 419, 325/47, 465, 468; 329/122, 123, 136; 340/147, 148, 149, 156, 160, 180, 170–172; 179/15 AP, 15 BD, 15 BL, 15 BY, 15 FD; 325/420, 423; 324/82

[56] References Cited

UNITED STATES PATENTS 2,911,528 11/1959 McRae ..................179/15 BL 3,506,967 4/1970 Foley.........................340/172

*Primary Examiner*—Albert J. Mayer

*Attorney*—Hofgren, Wegner, Allen, Stellman & McCord

[57] ABSTRACT

A remote control receiver selectively responsive to a plurality of different frequency command signals to control corresponding different command functions. The receiver uses a phase locked loop including a controlled oscillator having a variable frequency output which is compared in a phase comparator with the received command signal. The detected phase difference generates an error voltage which shifts the oscillator from its quiescent frequency to the incoming frequency and phase locks the controlled oscillator to the command signal. The error voltage also activates only one of several DC voltage comparators, with a different comparator corresponding to each command function. Each comparator includes a means of establishing a reference voltage and means for activating a driver stage for the corresponding remote function when the error voltage generated by the phase comparator to lock the receiver to a particular command frequency and equals the corresponding reference voltage.

7 Claims, 2 Drawing Figures

Figures 1, 2:
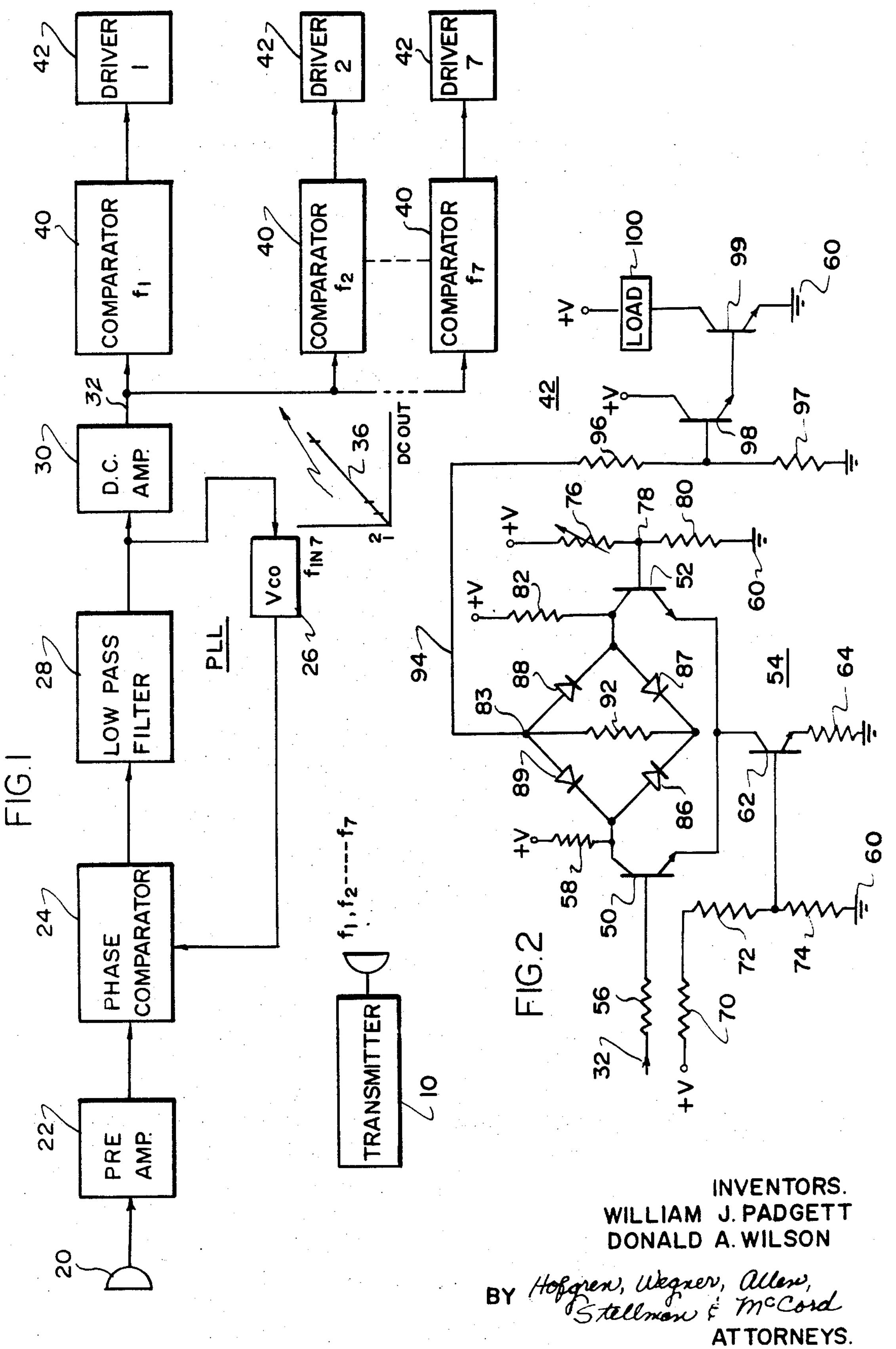

INVENTORS.
WILLIAM J. PADGETT
DONALD A. WILSON

BY Hofgren, Wegner, Allen, Stellman & McCord
ATTORNEYS.

REMOTE CONTROL RECEIVER USING A PHASE LOCKED LOOP

This invention relates to a decoder using a phase locked loop and a plurality of voltage comparators for detecting command signals which may have many different frequencies. The decoder is especially useful in a remote control receiver for detecting three or more command channels of different frequencies.

In one type of remote control system, a transmitter generates a different frequency tone or channel for each command function to be controlled. Depending on the type of apparatus being controlled, as an FM receiver or a TV receiver, the remote command functions may include station selection, volume control, etc. Typical prior receivers in such remote control systems have utilized a separate tuned circuit and connected detector for each channel to be decoded, for actuating a relay or other on-off type device.

While remote control systems of the above type are generally satisfactory in performance, they have other disadvantages. The tuned circuits are costly to manufacture and align, and are bulky. Also, the inductors required in the tuned circuits are not readily adapted to integrated circuit techniques.

In accordance with the present invention, a unique remote control receiver uses a phase locked loop, which can be locked over a large range of frequencies, to produce a generally ramp-shaped error voltage having continuous incremental shifts in level for each different received frequency. A separate level comparator is provided for each incremental level corresponding to the frequency of a command channel, to generate an output voltage only when the error voltage is equal to its preselected level. For all other levels, the comparator produces no output. Since tuned circuits are eliminated, the decoder is readily adapted for circuit integration, and can be of extremely compact size.

The use of a phase locked loop decoder to detect a frequency shift between two present frequencies is known, but not directly applicable to a remote control environment. In such known decoders, a received binary data signal, modulated by frequency shift keying (FSK), causes the loop to track between two frequencies, producing a corresponding DC shift which represents 0 and 1 bits. While such an application of a phase locked loop is satisfactory for FSK decoding, it has not been applied to frequency detection for a large number of carriers or tones, such as are generated in a remote control system.

A principle object of this invention is the provision of an improved remote control receiver for detecting three or more different frequency command channels, using a phase locked loop in combination with with a multi-level comparator.

Further advantages and features of the invention will be apparent from the following description, and from the drawings, in which:

FIG. 1 is a remote control system including a block diagram of a remote control receiver incorporating the invention; and FIG. 2 is a schematic diagram of one of the comparators shown in block form in FIG. 1.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

Turning to the drawings, a remote control system is illustrated in which a large number of different frequency carriers are individually generated. The remote control transmitter 10 may take any conventional form, acoustic or electronic. By way of example, Transmitter 10 may generate seven different frequencies in the range from 35 kHz to 45 kHz, $f_1$ through $f_7$, in order to control seven command functions associated with the operation of an FM receiver.

The transmitted command signal is received by any suitable transducer such as a ceramic or electrostatic microphone 20, FIG. 1, and amplified by a high gain, low noise preamplifier 22 before being coupled to a received signal input of a phase comparator 24 forming a part of a phase locked loop (PLL). For phase comparison, a reference input of the phase comparator 24 is coupled to a source of locally generated signal from a voltage controlled oscillator (VCO) 26. In response to the phase difference between the incoming frequency and the frequency of VCO 26, an error voltage is generated by phase comparator 24 and coupled through a low pass filter 28 to the VCO 26 and to a DC amplifier 30 having output proportional to the error voltage but amplified and changed in level appearing on a line 32 which drives the comparator circuits. By way of example, the PLL may be formed by a Signetics integrated circuits, type SE565.

The PLL is set so that the VCO 26 runs at a quiescent frequency which is not one of the command frequencies $f_1$ through $f_7$. When a command signal is received, the loop locks to the command frequency and the amplified DC error voltage on line 32 changes to a voltage related to the received frequency. The amplified DC error voltage, as illustrated by the ramp waveform 36, forms a generally linear ramp having a discrete level for each of the command frequencies $f_1$ through $f_7$. Due to phase jitter, each received signal of fixed frequency produces a range of DC voltages which have a slight excursion about a center point. The separate level for each channel to be decoded is chosen so that adjacent ranges of DC voltages do not overlap.

For each channel to be decoded, a corresponding DC voltage comparator 40 is provided to detect the occurrence of a particular voltage level and energize a driver 42 for the corresponding command function. Each comparator 40 is adjustable to selectively recognize a different voltage level, corresponding to the center point on ramp 36 for a particular received frequency. For error voltages less than and greater than the selected level, the comparator 40 does not energize driver 42.

Each comparator 40 and associated driver 42 may have the circuit illustrated in FIG. 2. A differential pair of NPN transistors 50 and 52 are connected to a current source 54. The loop error voltage, on line 32, is coupled through a 3.9 kilohm resistor 56 to the base of transistor 50. The collector of transistor 50 is coupled through a 10 kilohm resistor 58 to a source of positive DC voltage of +V, such as 12 volts relative to a source of reference potential or ground 60. The emitter of transistor 50 is directly coupled to the emitter of transistor 52.

Current source 54 consists of a NPN transistor 62 having a collector tied to the emitters of transistors 50 and 52, and an emitter coupled through a resistor 64 to ground 60. The base of transistor 62 is maintained at a fixed voltage by a voltage divider, consisting of an 18 kilohm resistor 70, a 5 kilohm resistor 72, and a 2.6 kilohm resistor 74 in series between +V and ground 60. The junction between resistors 72 and 74 is directly coupled to the base electrode, causing transistor 62 to maintain a constant current through its collector-emitter circuit.

The differential transistor 52 is coupled to an adjustable voltage source, selected to produce a voltage corresponding to the center point of a loop error voltage level which represents a command function to be decoded. The circuit will detect any voltage having a limited range of values about the center point, such as occurs due to phase jitter. For this purpose, a 2.5 kilohm variable resistor 76, a 8.2 kilohm resistor 78, and a 8.2 kilohm resistor 80 are coupled in series between +V and ground 60. The junction between resistors 78 and 80 is coupled to the base of transistor 52. Similar to transistor 50, transistor 52 has its collector coupled through a 10 kilohm resistor 82 to +V.

In order to detect when the voltages from line 32 and the voltage divider are equal, a bridge network is connected between the collectors of transistors 50 and 52 and the driver 42. Four semiconductor diodes 86, 87, 88 and 89 are connected to form a bridge, with one input junction (between diodes 86 and 89) being coupled to the collector of transistor 50, and the other input junction (between diodes 87 and 88) being coupled to the collector of transistor 52. The opposite or output terminals of the bridge are shunted through a 47 kilohm resistor 92. The junction 83 between diodes 88, 89 and resistor 92 is coupled through a line 94 and a current limiting resistors 96 and 97 to ground.

The driver 42 includes a NPN transistor 98, having its base coupled to the junction between resistors 96 and 97, its collector directly connected to +V, and its emitter directly connected to the base of a second NPN transistor 99. The emitter of transistor 99 is directly coupled to ground 60, and its collector is coupled through a load element 100 to +V. Load 100 may take any conventional form, as a relay or electronic circuit which when energized or turned on operates to control a selected function such as station selection, volume, on-off, bass, etc.

In operation, when a DC voltage from the DC amplifier is applied to the base of transistor 50, and equals the preselected voltage at the base of transistor 52 the flow of currents through the transistors 50 and 52 are approximately the same, each conducting about one-half of the total current through current source 54. The voltages at the collectors of transistors 50 and 52 under these conditions are also approximately equal positive values, which causes approximately equal current flow through both diodes 86 and 87 and thence through shunt resistor 92 to line 94.

Should the voltage at the base of transistor 50 increase from this level, the voltage at the collector of transistor would decrease and, because of the differential amplifier action, the voltage at the collector of transistor 52 would increase. Because of the diode 89, however, the voltage at junction 83 is clamped to the voltage at the collector of transistor 50 and follows the decreasing voltage rather than the increasing voltage. Thus it can be seen that as the voltage from DC amplifier 30 increases from the reference level set at the base of transistor 52, the voltage at junction 83 and consequently at the base of driver transistor 98 decreases.

Due to the action of the differential amplifier connection of transistors 50 and 52, the voltage at junction 83 also decreases in a similar manner when the voltage from DC amplifier 30 decreases. As the voltage at the base of transistor 50 decreases the voltage at its collector increases. Because of the differential amplifier connection however, the voltage at the collector of transistor 52 decreases. Under the circumstances the diode 88 functions to clamp the junction 83 to the decreasing voltage at the collector of transistor 52. In one embodiment of the invention the maximum voltage at junction 83 i.e. when the input voltage at the base of transistor 50 equals the reference voltage at the base of transistor 52, was found to be 7 volts and the minimum voltage i.e. when either transistor 50 or 52 is cut off, to be approximately 5 volts. The resistors 92, 96 and 97 are selected such that at the minimum voltage obtained at junction 83, the driver transistors 98 and 99 are either cut off or conducting a relatively low quiescent current insufficient to energize load 100, and at the maximum voltage obtained at junction 83 the driver transistors 98 and 99 are biased to a higher conduction level sufficient to energize load 100.

Thus, when a control signal is received, having a frequency that produces an error signal from phase comparator 24 which, when amplified by DC amplifier 30, equals the reference voltage on the base of transistor 52, the maximum voltage will be produced at junction 83 and the load 100 will be energized. At all other frequencies and corresponding voltages greater or less than the pre-set reference by a predetermined amount, the minimum voltage will be developed at junction 83 and the load 100 will be de-energized.

The selectivity of this system may be defined in terms of the range of voltage at the base of transistor 50 on either side of the preset reference voltage that will energize the load.

Since the voltage is proportional to the frequency of the received signal, this range of voltages is proportional to the range of frequencies to which each comparator will respond. This range of frequencies can be increased or decreased by respectively decreasing and increasing the value of resistor 92, or by other means.

The particular voltage and hence received frequency to which each comparator will respond can of course be readily pre-set or changed by simply changing the magnitude of the reference potential at the base of transistor 52. In the present embodiment this can be accomplished by adjusting resistor 76 to select a desired reference voltage point along the ramp curve 36.

We claim:

1. In a remote control system including a transmitter for generating a command signal having a selectable, one of at least three frequencies and a receiver for actuating a different remote element for each received command signal of different frequency, a decoder for the receiver, comprising;

phase locked loop means for tracking the received command signal including controlled oscillator means for generating an oscillatory signal having a frequency proportional to the amplitude of an error signal, and phase comparator means for comparing the phase difference between the received command signal and the oscillatory signal to generate said error signal, each selectable frequency of said command signal producing a unique amplitude of said error signal when the phase locked loop locks on the received command signal; and a plurality of detector means coupled to said phase comparator means for individually actuating an associated remote element, each detector means including level comparator means responsive to a different one of said unique amplitudes for actuating the associated remote element.

2. The apparatus of claim 1 wherein each detector means comprises a level comparator having first and second inputs and an output, means coupled to one of said inputs for establishing a reference signal thereon, means coupling said error signal to the other said inputs, said level detector producing a drive signal at said output having a predetermined given first magnitude when the signals on said first and second inputs are equal and a magnitude different, in the same sense, from said given magnitude when the signal at the said other of said inputs is both greater and less than the reference signal on said one of said inputs and means responsive to said drive signal on said output to actuate the associated remote element only when said driver signal approaches said given first magnitude.

3. The apparatus of claim 2 wherein said level comparator comprises a differential amplifier having a pair of input terminals and a pair of output terminals, one of said input terminals comprising said first level detector input and the other of said input terminals comprising said second level detector input, and drive signal producing means coupled to said pair of output terminals for producing said drive signal on said level detector output.

4. The apparatus of claim 3 wherein said drive signal producing means comprises a four-diode bridge having a pair of diagonally opposite input junctions, a pair of diagonally opposite output junctions and a load impedance coupled between said pair of output junctions, said pair of input junctions being connected to respective ones of said pair of differential amplifier output terminals, one of said pair of output junctions comprising said level detector output.

5. The apparatus of claim 4 wherein said four-diode bridge comprises first, second, third and fourth diodes, means connecting said first diode, said load impedance and said second diode in that order in series between said differential amplifier output terminals, both of said first and second diodes being poled to conduct current from said first output terminal to said second output terminal in a given direction through said load impedance and means connecting in the order named, said third diode, said load impedance and said fourth diode in series between said output terminals, said third and fourth diodes being poled to conduct current from said second output terminal to said first output terminal in said given direction through said load impedance, one end of said load impedance comprising said level detector output.

6. The apparatus of claim 3 wherein said differential amplifier comprises first and second transistors each having base, emitter and collector electrodes and further including means coupling said emitter electrodes in common to a source of reference potential and respective load impedances coupling said collector electrodes to a source of operating potential the base electrodes of said first and second transistors comprising said pair of input terminals and the junction between said collector electrodes and said respective load impedance means comprising said pair of output terminals.

7. The apparatus of claim 5 further comprising a constant current source coupled in series between said common connected emitter electrodes and said reference potential.

* * * * *